(12) United States Patent
Wesch et al.

(10) Patent No.: US 7,874,815 B2
(45) Date of Patent: Jan. 25, 2011

(54) HIGH-PRESSURE CLEANING APPLIANCE

(75) Inventors: Georg Wesch, Berglen (DE); Wolfgang Mueller, Remshalden-Geradstetten (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 478 days.

(21) Appl. No.: 11/894,048

(22) Filed: Aug. 16, 2007

(65) Prior Publication Data

US 2008/0029344 A1    Feb. 7, 2008

Related U.S. Application Data

(63) Continuation of application No. PCT/EP2006/000254, filed on Jan. 13, 2006.

(30) Foreign Application Priority Data

Feb. 21, 2005    (DE) .................... 10 2005 009 311

(51) Int. Cl.
*F04B 39/02* (2006.01)
*F04B 1/12* (2006.01)

(52) U.S. Cl. .................. 417/372; 417/269; 417/234; 92/12.2

(58) Field of Classification Search ............ 417/269, 417/366, 372, 234, 902; 92/12.2; 239/154
See application file for complete search history.

(56) References Cited

U.S. PATENT DOCUMENTS

| 4,518,323 | A | * | 5/1985 | Elson et al. ............ 417/312 |
| 4,583,921 | A | * | 4/1986 | Wolff et al. ............ 417/269 |
| 5,653,584 | A | | 8/1997 | Mazzucato et al. |
| 5,667,141 | A | * | 9/1997 | Suttner ............... 239/332 |
| 5,722,239 | A | * | 3/1998 | Houtman .............. 60/517 |

(Continued)

FOREIGN PATENT DOCUMENTS

DE    296 04 364    7/1997

(Continued)

*Primary Examiner*—Devon C Kramer
*Assistant Examiner*—Leonard J Weinstein
(74) *Attorney, Agent, or Firm*—Lipsitz & McAllister, LLC

(57) ABSTRACT

The invention relates to a high-pressure cleaning appliance with a motor-pump unit, comprising a pump head on which is positioned a piston subassembly, which carries a drive motor with the interposition of a planetary gearing, and has a plurality of pistons which can be moved back and forth in the longitudinal direction of the motor-pump unit and each penetrate into a pumping chamber of the pump head, and also comprising a swash-plate unit which interacts with the pistons, the planetary gearing having a sun gear which is connected in a rotationally fixed manner to the motor shaft of the drive motor and is coupled to a ring gear via planet gears rotatably mounted on a planet gear carrier, the planet gear carrier being connected in a rotationally fixed manner to the swash-plate unit. In order for it to be possible for the planetary gearing to be lubricated to good effect even when the motor-pump unit is oriented substantially vertically, it is proposed for the piston subassembly to have an oil sump into which penetrates an oil-delivery tube which is aligned coaxially with the motor shaft and is connected in a rotationally fixed manner to the planet gear carrier, it being possible for oil to be fed to the planetary gearing from the oil sump via the oil-delivery tube.

13 Claims, 5 Drawing Sheets

U.S. PATENT DOCUMENTS

| | | | |
|---|---|---|---|
| 5,836,846 A | * 11/1998 | Hewko et al. | 475/149 |
| 5,975,863 A | * 11/1999 | Mazzucato | 417/269 |
| 6,092,998 A | 7/2000 | Dexter et al. | |
| 6,112,641 A | 9/2000 | Magri et al. | |

FOREIGN PATENT DOCUMENTS

| | | | |
|---|---|---|---|
| DE | 298 13 978 | 11/1998 | |
| DE | 298 11 966 | 12/1998 | |
| DE | 297 23 942 | 7/1999 | |
| EP | 0 503 298 | 9/1992 | |
| EP | 1 384 529 | 1/2004 | |
| WO | WO 00/08335 | * 2/2000 | |

* cited by examiner

HIGH-PRESSURE CLEANING APPLIANCE

This application is a continuation of international application number PCT/EP2006/000254 filed on Jan. 13, 2006.

The present disclosure relates to the subject matter disclosed in international application number PCT/EP2006/000254 of Jan. 13, 2006 and German application number 10 2005 009 311.6 of Feb. 21, 2005, which are incorporated herein by reference in their entirety and for all purposes.

BACKGROUND OF THE INVENTION

The invention relates to a high-pressure cleaning appliance with a motor-pump unit, comprising a pump head on which is positioned a piston subassembly, on which a drive motor is seated with the interposition of a planetary gearing, the piston subassembly having a plurality of pistons which can be moved back and forth in the longitudinal direction of the motor-pump unit and each penetrate into a pumping chamber of the pump head, and also comprising a swash-plate unit which interacts with the pistons, and the planetary gearing having a sun gear which is connected in a rotatably fixed manner to the motor shaft of the drive motor and is coupled to a ring gear via a plurality of planet gears rotatably mounted on a planet gear carrier, the planet gear carrier being connected in a rotationally fixed manner to the swash-plate unit.

By means of such high-pressure cleaning appliances, a cleaning liquid, preferably water, can be subjected to pressure and directed onto a surface which is to be cleaned. For this purpose, the swash-plate unit is made to rotate by the drive motor, and the pistons, which interact with the swash-plate unit, are caused to move back and forth, so that cleaning liquid can be sucked into the pumping chambers of the pump head and then discharged under high pressure. In the operating position of the high-pressure cleaning appliance, the drive motor, the piston subassembly and the pump head, which together form a motor-pump unit, are usually oriented horizontally. This makes it possible to ensure, in a constructionally simple manner, that in particular the planetary gearing can be supplied with oil for lubricating purposes.

U.S. Pat. No. 6,092,998 discloses a high-pressure cleaning appliance in which the motor-pump unit is oriented vertically in the operating position. The motor-pump unit, however, is configured straightforwardly by the motor shaft being coupled directly to the swash-plate unit without interposition of a planetary gearing.

It is an object of the present invention to develop a high-pressure cleaning appliance of the type mentioned in the introduction such that the planetary gearing can be lubricated to good effect even when the motor-pump unit is oriented substantially vertically.

SUMMARY OF THE INVENTION

This object is achieved according to the invention, in the case of a high-pressure cleaning appliance of the generic type, by the piston subassembly having an oil sump into which penetrates an oil-delivery tube which is aligned coaxially with the motor shaft and is connected in a rotationally fixed manner to the planet gear carrier, it being possible for oil to be fed to the planetary gearing from the oil sump via the oil-delivery tube.

Use of the oil-delivery tube connected in a rotationally fixed manner to the planet gear carrier, and aligned coaxially with the motor shaft, makes it possible, in a constructionally simple manner, to deliver oil to the planetary gearing from the oil sump via the oil-delivery tube, which rotates about its longitudinal axis together with the planet gear carrier, so that, despite the motor-pump unit being oriented vertically, the planetary gearing is lubricated with oil from the oil sump. The oil can be fed via the oil-delivery tube, for example, to the sun gear and, from the sun gear, can be distributed over the entire planetary gearing via the planet gears. The distribution of the oil is assisted by the pronounced centrifugal forces which prevail during operation of the high-pressure cleaning appliance.

In the case of a preferred configuration, the oil-delivery tube is formed as a sleeve which is inserted into the planet gear carrier, for example the sleeve can be pressed into the planet gear carrier. The internal diameter of the sleeve may be selected such that the oil flowing into the sleeve is subjected to capillary forces which ensure that the oil from the oil sump is drawn upward within the sleeve in the direction of the planetary gearing.

In the case of an advantageous embodiment, the sleeve can be latched to the planet gear carrier. This simplifies the assembly of the motor-pump unit. Provision may be made, for example, for latching hooks which engage behind a latching surface of the planet gear carrier to be disposed on the sleeve. Latching recesses, into which latching elements of the planet gear carrier latch, may also be disposed on the sleeve.

The sleeve is preferably inserted into a hollow stub of the planet gear carrier, for example pressed into the same and/or latched to the same. A swash body of the swash-plate unit may be mounted in a rotationally fixed manner on the hollow stub, the swash body having mounted on it a swash plate which is oriented obliquely in relation to the longitudinal axis of the motor-pump unit and against which the pistons butt by way of their ends which are directed away from the piston pump.

The sleeve is preferably produced from plastics material.

It is advantageous if the internal diameter of the oil-delivery tube widens in the direction away from the oil sump. Provision may thus be made, for example, for the oil-delivery tube to form at least one step, via which the internal diameter of the oil-delivery tube widens.

It is particularly advantageous if the internal diameter of the oil-delivery tube widens conically at least in one longitudinal portion. A cone angle of approximately 5° to around 10°, in particular a cone angle of approximately 7° to 9°, is particularly advantageous here in order to ensure that the planetary gearing is reliably supplied with oil from the oil sump despite the motor-pump unit being oriented vertically.

In the case of a preferred embodiment of the invention, at its lower end region, which penetrates into the oil sump, the oil-delivery tube has an entry portion which tapers conically in the direction away from the oil sump. It is advantageous here if the entry portion is followed by a central portion, with the internal diameter of the oil-delivery tube remaining constant, the central portion being adjoined, in turn, by a conically widening exit portion, which extends up to that end of the oil-delivery tube which is directed away from the oil sump. The length of the exit portion may be approximately equal to the length of the central portion, whereas the entry portion may be selected to be considerably shorter, in particular provision may be made for the length of the entry portion to correspond, at most, approximately to a tenth of the length of the exit portion.

It is particularly advantageous if at an upper end region, which is directed away from the oil sump, the oil-delivery tube has an oil atomizer. By means of the oil atomizer, the oil delivered from the oil sump can be broken up into very small droplets and then distributed chaotically in the planetary gearing. The lubrication of the planetary gearing can be improved as a result.

The oil atomizer preferably has a plurality of teeth which project from the upper end of the oil-delivery tube, this end being directed away from the oil sump. The teeth may be of sharp-edged configuration. As seen in the circumferential direction of the oil-delivery tube, the teeth are preferably distributed non-uniformly over the upper end of the tube. Provision may thus be made, for example, for grooves to run between the teeth, these grooves being formed in the upper end of the oil-delivery tube and being oriented perpendicularly to the longitudinal axis of the oil-delivery tube, preferably two grooves being disposed parallel to one another.

At least one tooth preferably forms a latching element which interacts with the planet gear carrier. The at least one tooth, configured as a latching element, makes possible, in a constructionally simple manner, a latching connection between the oil-delivery tube and the planet gear carrier via the oil atomizer. Provision may be made, for example, for the at least one tooth to form a latching hook which engages behind a central part of the planet gear carrier.

The operation of atomizing the oil delivered from the oil sump is improved, in the case of an advantageous embodiment, by the oil atomizer having at least one slot which runs coaxially with the longitudinal axis of the oil-delivery tube and opens out into the upper end of the oil-delivery tube, this end being directed away from the oil sump. The oil-delivery tube preferably has a plurality of slots distributed non-uniformly in the circumferential direction. It is particularly advantageous if the slots are formed in an oil-delivery-tube exit portion which widens conically in the direction away from the oil sump, the length of the slots corresponding approximately to a quarter to approximately half of the length of the exit portion.

The oil atomizer may be connected integrally to the oil-delivery tube. As an alternative, provision may be made for the oil atomizer to be configured as a separate component which is seated on the upper end of the oil-delivery tube.

As already explained, the oil-delivery tube may be configured as a sleeve which is inserted into the planet gear carrier. As an alternative, provision may be made for the oil-delivery tube to be connected integrally to the planet gear carrier by the tube being configured as a hollow shank of the planet gear carrier, this hollow shank being aligned coaxially with the motor shaft and penetrating into the oil sump. In the case of such an embodiment, the planet gear carrier extends by way of the hollow shank into the oil sump of the piston subassembly, so that, via the hollow shank, oil can be transferred directly into the region of the planetary gearing from the oil sump.

It is particularly advantageous here if the hollow shank has at least one delivery device for delivering oil from the oil sump. This makes it possible to configure the hollow shank with a comparatively large internal diameter, this resulting in the capillary forces which act on the oil being reduced. In order nevertheless to ensure sufficient lubrication of the planetary gearing, use is made of at least one delivery device which transfers oil to the planetary gearing from the oil sump via the hollow shank.

The delivery device may have, for example, at least one helical groove formed on the inside of the hollow shank. Use is preferably made of two helical grooves which, starting from the lower end, which is directed toward the oil sump, extend up to the upper end of the hollow shank, which is directed away from the oil sump. Oil flowing into the grooves is raised by way of the rotating hollow shank, via the grooves, up to the upper end of the hollow shank, from which the oil is distributed within the planetary gearing on account of the action of centrifugal force.

The following description of preferred embodiments of the invention provides a more detailed explanation in conjunction with the drawings.

DETAILED DESCRIPTION OF THE INVENTION

Figure 1:
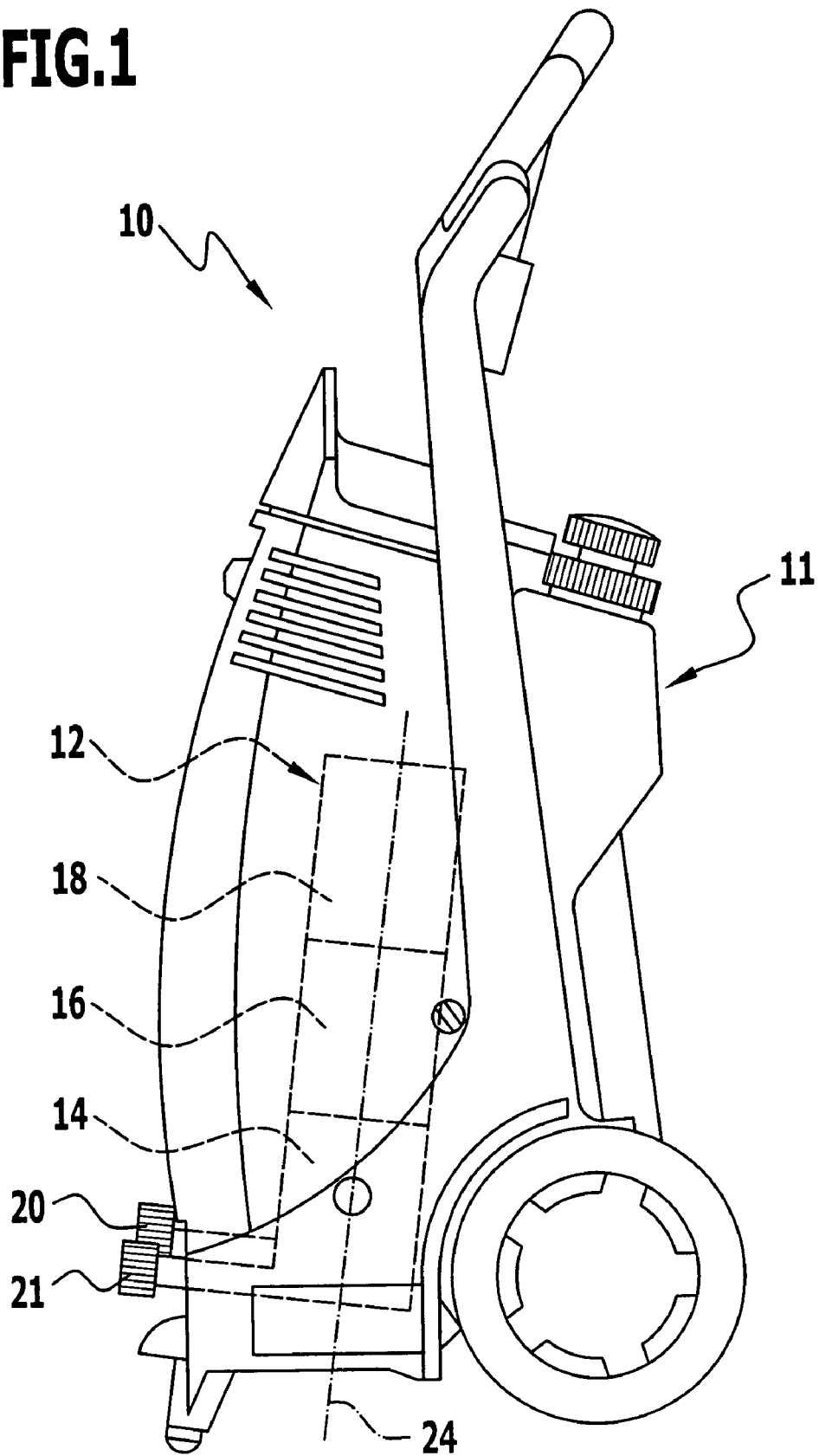
FIG. 1 shows a side view of a high-pressure cleaning appliance with a substantially vertically oriented motor-pump unit.

In FIG. 1, there is illustrated, schematically, a high-pressure cleaning appliance 10 with a housing 11 which encloses a substantially vertically oriented motor-pump unit 12. The motor-pump unit 12 comprises a pump head 14 on which is seated a piston subassembly 16 which, in turn, carries a drive motor 18.

The pump head 14 has a suction connection 20 and a pressure connection 21. A cleaning-agent feed line can be connected to the suction connection 20, and the high-pressure cleaning appliance 10 can be supplied with cleaning agent, preferably water, via this feed line. A high-pressure line can be connected to the pressure connection 21, and, for example, a spray lance can be arranged at that end of the high-pressure line which is directed away from the high-pressure cleaning appliance 10, in order for a pressurized cleaning liquid to be applied to a surface which is to be cleaned.

The piston subassembly 16 has a plurality of pistons 23 which are aligned parallel to the longitudinal axis 24 of the motor-pump unit 12 and penetrate into a pumping chamber 25 of the pump head 14 in each case by way of their lower end, which is directed toward the pump head. The pistons 23 have their upper end, which is directed away from the pump head 14 butting against a swash plate 27 of a swash-plate unit 28. The swash plate 27 is oriented obliquely in relation to the longitudinal axis 24 and is mounted on a swash body 29. The swash body 29 is made to rotate about the longitudinal axis 24 by the drive motor 18, via a planetary gearing 31. The planetary gearing 31 comprises a sun gear 32, which is rotatable about the longitudinal axis 24 and is secured in a rotationally fixed manner on a motor shaft 34 of the drive motor 18. The sun gear 32 meshes with planet gears 36, 38, which are each rotatably mounted on a hollow carrying stub 37 and 39 respectively of a rotatable planet gear carrier 41 and mesh with a ring gear 43. The carrying stubs 37, 39 are connected integrally to a cup-like central part 45 of the planet gear carrier 41, the base wall 46 of the latter being followed integrally, in the direction away from the carrying stubs 37, 39, by a cylindrical hollow stub 47 which is aligned coaxially with the longitudinal axis 24 and extends to the level of the swash plate 27. The swash-plate body 29 is mounted in a rotationally fixed manner on the hollow stub 47.

During operation of the high-pressure cleaning appliance 10, the rotary movement of the motor shaft 34 is transferred to the planet gears 36 and 38 via the sun gear 32, and the planet gear carrier 41 and the swash body 29, which is secured thereon, are thus made to rotate. The rotary movement of the swash body 29 leads to a rocking movement of the swash plate 27. This results in the pistons 23, which are biased in the direction of the swash plate 27 by means of compression springs 49, executing a back and forth movement which is aligned parallel to the longitudinal axis 24, so that cleaning liquid can be sucked into the respective pumping chamber 25 and then discharged under pressure.

The piston subassembly 16 has a housing 51 with a cylindrical housing casing 52 which is positioned on a housing base 53, through which the pistons 23 pass, and carries a housing top 54. The housing top is followed integrally by a collar 55, which has the ring gear 43 on its inside. The housing top 54 contains a through-opening 56, through which the planet gear carrier 41 passes.

The housing base 53 and the housing casing 52 define an oil-filled oil chamber, a so-called oil sump 58, which extends vertically approximately up to the level of the upper ends of the pistons 23 when the latter assume the position in which they have advanced in the direction of the respective pumping chamber 25. An oil-delivery tube 60 penetrates into the oil sump 58, this tube providing a delivery connection between the oil sump 58 and the interior of the cup-like central part 45 of the planet gear carrier 41, so that oil can be delivered from the oil sump 58, via the oil-delivery tube 60 to the sun gear 32 via which the oil can be distributed throughout the planetary gearing 31.

Figure 3:
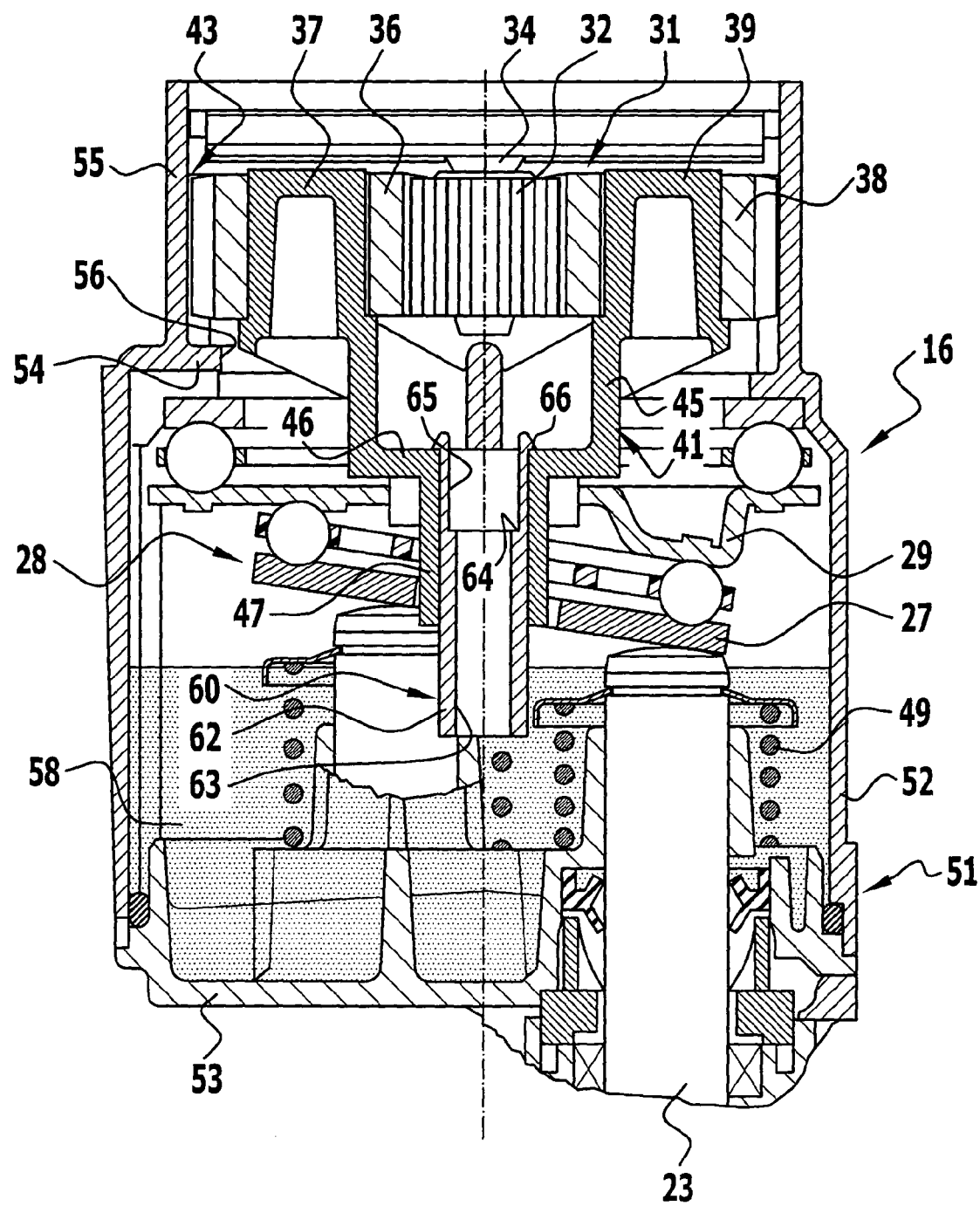
FIG. 3 shows an enlarged sectioned illustration of a sub-region of the motor-pump unit from FIG. 2, according to a first embodiment of the invention.

In the case of the embodiment of the invention which is illustrated in FIG. 3, the oil-delivery tube 60 is formed by a sleeve 62 which is inserted into the hollow stub 47 of the planet gear carrier 41, is latched to the central part 45 and is aligned colinearly with the longitudinal axis 24. The sleeve 62 has a lower longitudinal portion 63 which is directed toward the oil sump 58 and merges into an upper longitudinal portion 65 via a radially outwardly directed step 64, the lower longitudinal portion 63 having a smaller internal diameter than the upper longitudinal portion 65. The oil from the oil sump 58 penetrating into the lower longitudinal portion 63 is subjected to capillary forces within the lower longitudinal portion 63, so that it is drawn upward in the direction of the upper longitudinal portion 65. During operation of the high-pressure cleaning appliance 10, on account of the rotary movement of the sleeve 62, the oil is additionally subjected to centrifugal forces by means of which the oil is forced against the inner wall of the sleeve 62, the capillary forces being assisted thereby. This results overall in the oil flowing through the sleeve 62 up to the central part 45, from which it is thrown into the sun gear 32.

In order to form a latching connection between the planet gear carrier 41 and the sleeve 62, the latter has on its upper end, which is directed away from the oil sump 58, a plurality of latching hooks 66 which engage behind the base wall 46 of the central part 45.

Use of the sleeve 62 ensures that the planetary gearing 31 is lubricated with oil to a sufficient extent despite the motor-pump unit 12 being oriented substantially vertically.

Figure 4:
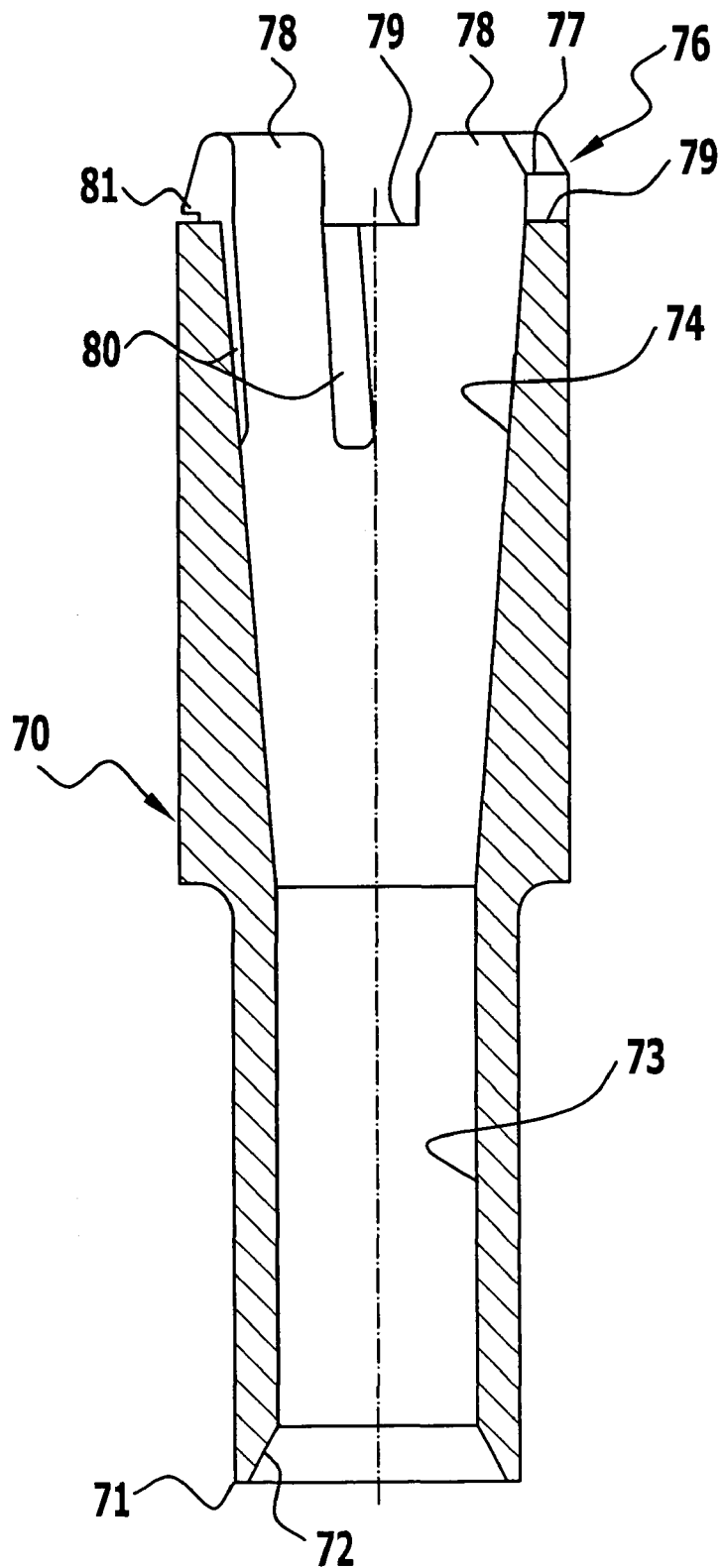
FIG. 4 shows a sectional view of an alternative configuration of a sleeve used in the embodiment according to FIG. 3.

FIG. 4 illustrates an alternative configuration of a sleeve which can be inserted into the hollow stub 47 and can be latched to the central part 45, this sleeve being designated overall by the reference numeral 70. At its lower end 71, which penetrates into the oil sump 58, the sleeve 70 has an entry portion 72 which tapers conically in the direction away from the oil sump 58 and is adjoined by a constant-diameter central portion 73 which is adjoined, in turn, by an exit portion 74, which widens conically in the direction away from the oil sump 58. The cone angle of the exit portion 74 is around 8°, whereas the cone angle of the entry portion 72 is approximately 50°. The length of the exit portion 74 corresponds approximately- to the length of the central portion 73, whereas the length of the entry portion 72 is selected to be considerably smaller; it corresponds substantially just to a tenth of the length of the exit portion 74.

An oil atomizer 76 is disposed on the upper end region of the sleeve 62. This atomizer comprises a plurality of sharp-edged teeth 78 which adjoin the upper end 77 of the sleeve 70 integrally and are separated from one another by means of grooves 79 which are formed in the upper end 77 and run transversely to the longitudinal axis 24. Opening out into the grooves 79 are longitudinal slots 80 which are formed in the wall of the exit portion 74 and extend approximately over a third of the length of the exit portion 74. The teeth 78 each form a latching hook 81 which engages behind the base wall 46 of the central part 45.

If the sleeve 70 is inserted into the hollow stub 47 of the planet gear carrier 41 then the latching hooks 81 snap into their latching position, the sleeve 70 being connected in a rotationally fixed manner to the planet gear carrier 41. The length of the sleeve 70 is dimensioned such that it penetrates into the oil sump 58. Oil is drawn upward within the sleeve 62 on account of the action of capillary forces, the capillary forces being assisted by the action of centrifugal forces. In the region of the oil atomizer 76, the ascending oil is broken up into very small droplets and distributed chaotically in the central part 45 of the planet gear carrier 41, some of the oil also being thrown directly in the direction of the sun gear 32, so that the latter is wetted with oil.

Figure 5:
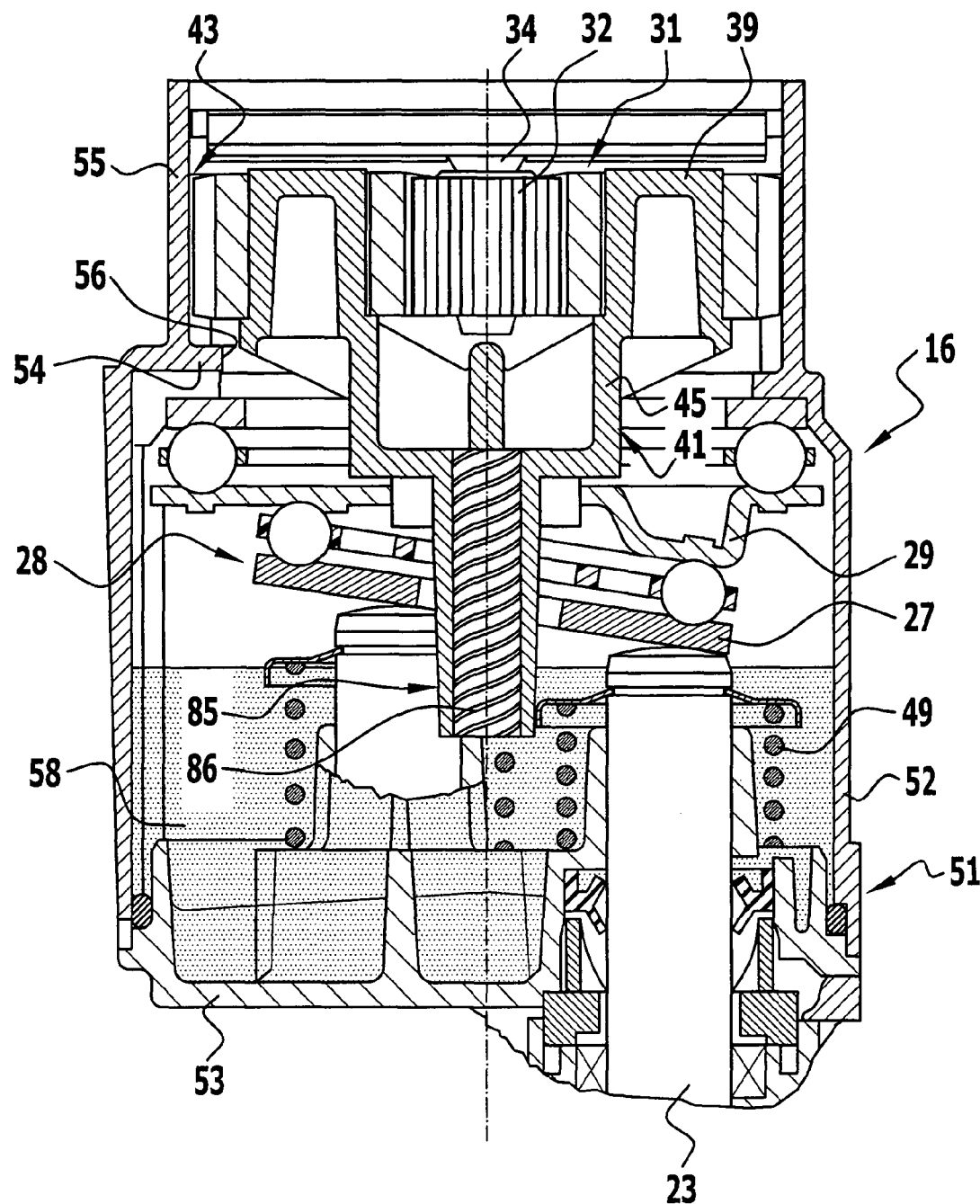
FIG. 5 shows an enlarged sectional illustration, corresponding to FIG. 3, of a further embodiment of the invention.

In FIG. 5, there is illustrated a partially sectional view of a further alternative configuration of a high-pressure cleaning appliance according to the invention, which is largely identical to the high-pressure cleaning appliance 10 described above. For identical components, the same reference numerals are thus used in FIG. 5 as in FIGS. 1 to 3.

Figure 2:
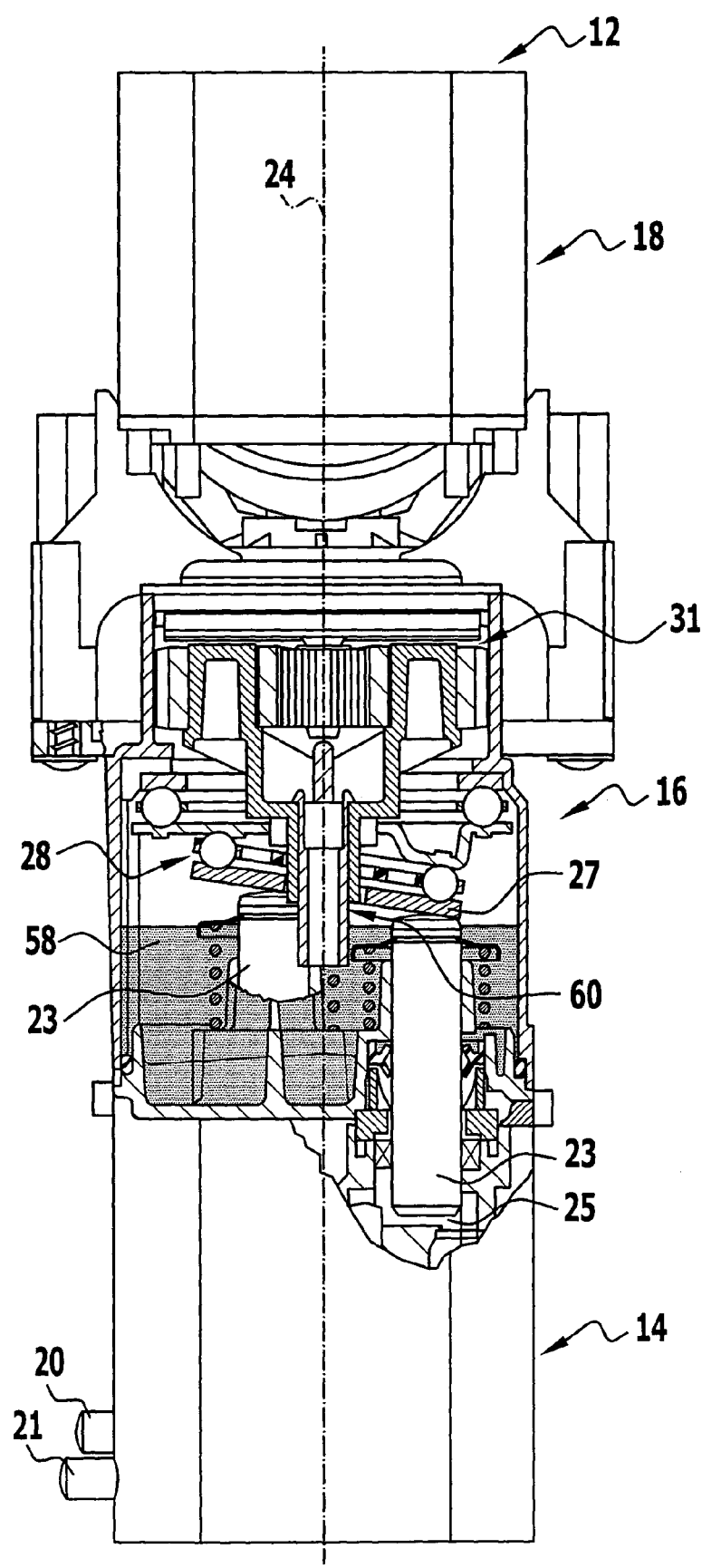
FIG. 2 shows a partially sectional side view of the motor-pump unit from FIG. 1.

The configuration which is illustrated in FIG. 5 differs from the embodiment which is illustrated in FIGS. 1 to 3 in that use is made of an oil-delivery tube which is connected integrally to the planet gear carrier 41 and is in the form of a hollow shank 85 of the planet gear carrier 41. The hollow shank 85 penetrates into the oil sump 58 and, on its inside, has an oil-delivery device in the form of a helical groove 86. It forms a direct delivery connection between the oil sump 58 and the planetary gearing 31.

By virtue of the hollow shank 85 being used, the planet gear carrier 41 extends into the oil sump 58, so that oil can penetrate directly into the planet gear carrier 41 and can be raised to such an extent by means of the oil-delivery device in the form of the groove 86 that it reaches the central part 45 of the planet gear carrier 41, from which it is reliably distributed within the planetary gearing 31 on account of the action of centrifugal forces. Reliable lubrication of the planetary gearing 31 can thus also be ensured by means of an oil-delivery tube which is connected integrally to the planet gear carrier 41.

The invention claimed is:

1. A high-pressure cleaning appliance with a motor-pump unit, comprising:
a pump head,
a piston subassembly positioned on the pump head,
a drive motor seated on the piston subassembly,
a planetary gearing disposed within the piston subassembly on a side of the piston subassembly where the drive motor is seated, the piston subassembly having a plurality of pistons which are movable back and forth in a longitudinal direction of the motor-pump unit, each of the pistons penetrating into a pumping chamber of the pump head, a swash-plate unit which interacts with the pistons, and the planetary gearing having a sun gear which is connected in a rotationally fixed manner to a motor shaft of the drive motor and is coupled to a ring gear via a plurality of planet gears rotatably mounted on a planet gear carrier, the planet gear carrier being connected in a rotationally fixed manner to the swash-plate unit, and the piston subassembly having an oil sump into which penetrates an oil-delivery tube which is aligned coaxially with the motor shaft and is connected in a rotationally fixed manner to the planet gear carrier, said oil-delivery tube feeding oil to the planetary gearing from the oil sump, wherein:
the oil-delivery tube is configured as a sleeve which is inserted into the planet gear carrier, and
the sleeve is adapted to be latched to the planet gear carrier.

2. A high-pressure cleaning appliance according to claim 1, wherein an internal diameter of the oil-delivery tube widens in a direction leading away from the oil sump.

3. A high-pressure cleaning appliance according to claim 2, wherein the internal diameter of the oil-delivery tube widens conically at least in one longitudinal portion.

4. A high-pressure cleaning appliance according to claim 1, wherein at a lower end region, which penetrates into the oil sump, the oil-delivery tube has an entry portion which tapers conically in a direction leading away from the oil sump.

5. A high-pressure cleaning appliance with a motor-pump unit, comprising:

a pump head, a piston subassembly positioned on the pump head, a drive motor seated on the piston subassembly, a planetary gearing disposed within the piston subassembly on a side of the piston subassembly where the drive motor is seated, the piston subassembly having a plurality of pistons which are movable back and forth in a longitudinal direction of the motor-pump unit, each of the pistons penetrating into a pumping chamber of the pump head, a swash-plate unit which interacts with the pistons, and the planetary gearing having a sun gear which is connected in a rotationally fixed manner to a motor shaft of the drive motor and is coupled to a ring gear via a plurality of planet gears rotatably mounted on a planet gear carrier, the planet gear carrier being connected in a rotationally fixed manner to the swash-plate unit, and the piston subassembly having an oil sump into which penetrates an oil-delivery tube which is aligned coaxially with the motor shaft and is connected in a rotationally fixed manner to the planet gear carrier, said oil-delivery tube feeding oil to the planetary gearing from the oil sump, wherein at an upper end region, which is directed away from the oil sump, the oil-delivery tube has an oil atomizer.

6. A high-pressure cleaning appliance according to claim 5, wherein the oil-delivery tube is configured as a sleeve which is inserted into the planet gear carrier.

7. A high-pressure cleaning appliance according to claim 6, wherein the sleeve is inserted into a hollow stub of the planet gear carrier.

8. A high-pressure cleaning appliance according to claim 6, wherein the sleeve is produced from plastics material.

9. A high-pressure cleaning appliance according to claim 5, wherein the oil atomizer has a plurality of teeth which project from an end of the oil-delivery tube, the end being directed away from the oil sump.

10. A high-pressure cleaning appliance according to claim 9, wherein at least one tooth of the plurality of teeth forms a latching element which interacts with the planet gear carrier.

11. A high-pressure cleaning appliance according to claim 5, wherein the oil atomizer has at least one slot which runs coaxially with a longitudinal axis of the oil-delivery tube and opens out into an end of the oil-delivery tube, the end being directed away from the oil sump.

12. A high-pressure cleaning appliance according to claim 5, wherein the oil atomizer is connected integrally to the oil-delivery tube.

13. A high-pressure cleaning appliance with a motor-pump unit, comprising:

a pump head having a suction connection and a pressure connection, said pump head adapted to subject a cleaning agent supplied via the suction connection to pressure and to output pressurized cleaning agent via the pressure connection, a piston subassembly positioned on the pump head, a drive motor seated on the piston subassembly, a planetary gearing disposed within the piston subassembly on a side of the piston subassembly where the drive motor is seated, the piston subassembly having a plurality of pistons which are movable back and forth in a longitudinal direction of the motor-pump unit, each of the pistons penetrating into a pumping chamber of the pump head, a swash-plate unit which interacts with the pistons, the planetary gearing having a sun gear which is connected in a rotationally fixed manner to a motor shaft of the drive motor and is coupled to a ring gear via a plurality of planet gears rotatably mounted on a planet gear carrier, the planet gear carrier being connected in a rotationally fixed manner to the swash-plate unit, the piston subassembly having an oil sump into which penetrates an oil-delivery tube which is aligned coaxially with the motor shaft and is connected in a rotationally fixed manner to the planet gear carrier, and said oil-delivery tube feeding oil to the planetary gearing from the oil sump;

wherein:
the oil-delivery tube is configured as a hollow shank of the planet gear carrier, the hollow shank being aligned coaxially with the motor shaft and penetrating into the oil sump;
the hollow shank has at least one delivery device for delivering oil from the oil sump; and
the delivery device comprises at least one helical groove formed on an inside of the hollow shank.

* * * * *